United States Patent [19]

Siden et al.

[11] 4,023,272
[45] May 17, 1977

[54] NON-SHORTING WIRE CUTTER

[75] Inventors: Dennis C. Siden, Portola Valley; Corey J. McMills, Los Altos, both of Calif.

[73] Assignee: Raychem Corporation, Menlo Park, Calif.

[22] Filed: Sept. 25, 1975

[21] Appl. No.: 616,831

[52] U.S. Cl. .................................. 30/257; 29/758; 83/13
[51] Int. Cl.² ........................................ B26B 13/02
[58] Field of Search ............ 30/254, 345, 229, 233, 30/257, 259; 29/203 H; 83/13; 128/318

[56] References Cited
UNITED STATES PATENTS

| 2,563,521 | 8/1951  | Ferriot    | 30/245   |
| 3,372,482 | 3/1968  | Mercorelli | 30/229   |
| 3,858,158 | 12/1974 | Henn       | 29/203 H |
| 3,921,640 | 11/1975 | Freeborn   | 128/318  |

*Primary Examiner*—Al Lawrence Smith
*Assistant Examiner*—J. C. Peters
*Attorney, Agent, or Firm*—Lyon & Lyon

[57] ABSTRACT

A wire cutting device having a blade angle of about 0° and whose blades exhibit a bulk resistivity of at least about 1.0 ohm-cm can be used to safely sever plural conductors while in-service without causing a short circuit. Blade materials are typically polymeric materials with a Rockwell hardness of about M30 or greater.

15 Claims, 6 Drawing Figures

NON-SHORTING WIRE CUTTER

CROSS-REFERENCE TO RELATED APPLICATIONS

This application is related to copending application of Siden, "Deformable Wire Stripper", Ser. No. 626,780 filed Oct. 29, 1975, which is a continuation-in-part of copending application Ser. No. 480,821 filed June 19, 1974, now U.S. Pat. No. 3,931,672 issued Jan. 13, 1976. The disclosures of these are incorporated by reference.

FIELD OF THE INVENTION

This invention relates to means for cutting wire. In another aspect it relates to means for cutting plural individual conductors while in service.

BACKGROUND OF THE INVENTION

Telephone cable is typically a package of plural individaul conductors having their own insulating sleeve or coating. This insulation normally is a polymeric material. The individual insulated conductors (wires) are combined into a bundle around which is disposed a covering layer of relatively heavy duty insulating material in order to provide protection from mechanical damage, corrosion or other environmental hazards. Thus each cable can carry numerous telephone "lines".

There are many instances when it is desirable to form a splice with the individual wire members of a telephone cable to make a new circuit when the cable is in service in a manner that does not disturb that service and then detach one leg of the splice formed by the old cable. This might be done in order to replace a length of old cable or to make connection with new equipment.

Frequently these splices are made by what the art refers to as Y splices using specially adapted splice connectors of the MS² or SECS types. These provide means for making splices with the usual cable bundle of 50 individual wire conductors to form the Y splice. Then one leg of the Y is detached without interrupting service. Heretofore, the practice has been to detach the old circuit with conventional wire cutting equipment, typically metal snips or tool steel diagonal cutters. In order to do this, the closely spaced wires must be carefully separated and individually cut as near the splice connector as possible. Simultaneous cutting of multiple conductors is not possible because the metal tool will cause a short circuit between one or more pairs of conductors and disrupt service by causing the lines they carry to be non-usable or "go off the air". Even when the wires are individually cut, accidental contact of the cutting tool with a previously cut wire can still result in the short circuit condition. As a result, extreme care is demanded causing the operation to be a very time consuming one.

Similar problems exist in other areas. For example, there are occasions when connection is made to a new computer before disconnection from the old in order to main continuous data processing or other service by the computers. If short circuits are caused in severing the old connections that can cause service interruption.

From the foregoing, it can be seen that it would be a useful advance in the art to provide a means for rapidly severing multiple conductors when they carry a current without causing a short circuit. Accordingly, one object of this invention is to provide an improved means for cutting or severing plural conductors while they are in service.

Another object of this invention is to provide a process by which plural conductors can be severed while in use.

SUMMARY OF THE INVENTION

The foregoing and other objects of this invention are achieved by the apparatus of the present invention in which cutting means are provided having a pair of blades that are offset from and movable relative to each other so as to contact the substrate to be severed between them at a blade angle of about 0°. The blades should be of a material that exhibits a bulk resistivity of at least about 1.0 ohm-cm. Preferably the blade material is an organic polymer having a Rockwell hardness of M30 or greater.

Upon application of sufficient force to such blades and insulated conductors located between them, the conductors can be severed without causing a short circuit.

DETAILED DESCRIPTION OF THE INVENTION

This invention provides a method and apparatus for cutting insulated wires by which it is possible to cut plural insulated wires simultaneously while the wires are carrying a current without creating a short circuit between one or more pairs of the conductors. By use of the term wire is meant not only conventional, concentrically arranged insulated conductors for which prior art wire cutters are normally designed to cut, but also, other "wire" configurations for which the invention is particularly suited. Therefore, the term "wire" is not to be narrowly construed as it includes a variety of conductor-insulation configurations of which flat cable and ribbon cable are also examples.

Figure 1:
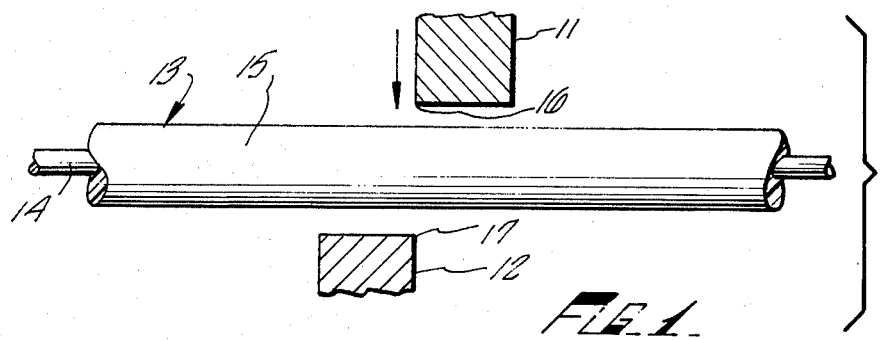
FIG. 1 is an illustration of a pair of blades according to the present invention.

Referring now to FIG. 1, there is an illustration of a pair of blades 11 and 12 having located there between a conventional wire 13 comprised of a metal conductor 14 surrounded by an insulation cover 15.

It will be understood that the apparatus of the invention is particularly useful for cutting multiple strands of conductor and that only one is shown merely for purposes of illustration.

Blades 11 and 12 are fabricated from a material having a bulk resistivity of at least about 1.0 ohm-cm in order that it not cause a short circuit when the cutter is used to sever wires carrying a current and in order that the severance of the wires can be made without danger to the operator of the cutter. Surprisingly we have found that organic polymers are particularly useful for this purpose even though their hardness is considerably less than the conducting element of the wire being cut if the blades of the cutter are provided the configuration shown in FIG. 1.

As shown, blades 11 and 12 have a thickness of uniform cross-section, giving them a blade angle of 0°, in order that they will resist deformation when contact is made with the wire 13 and conducting element 14 after cutting through the insulation 15.

The blades are offset as shown in FIG. 1 in order to allow both blades to pass through the wire from opposite sides. In FIG. 1, 16 and 17 represent the opposing cutting edges by which wire is deformed and cut. The force required to deform the blade is large compared to the shear strength of typical conductors. If the blades were designed as are conventional wire cutters, the blades of which are designed to pass through the wire and contact each other on their cutting surfaces, the result would be merely to compress the wire 13. Any displacement of the offset blades should be as little as possible. Preferably it is less than 1 wire diameter.

In order to limit the blade thickness required to avoid deformation, the blade materials preferably have a Rockwell hardness of at least about M30. Suitable polymers for this purpose include thermoset resins and engineering thermoplastics such as epoxy resin, acrylic polymers such as the homopolymers and copolymers of acrylic acid and similar acids such as methacrylic acid and their alkyl esters such as ethyl acrylate and methyl methacrylate, and acrylonitrile and its copolymers such as acrylonitrile-butadiene-styrene copolymer. Polyamides such as nylon 6/6, polycarbonates, and polyaromatic polymers such as polyphenylene oxide, polyaryl ketones, polyaryl sulfones and polystyrene can be used. Also useful are polyvinylidene fluoride, polyvinyl chloride and other haloolefin polymers. Formaldehyde resins such as acetals or the phenal-aldehyde resins would also be useful. The foregoing list it not an exhaustive one. Rather, it is merely illustrative of the types of polymers useful. These polymers in many cases can be advantageously employed as reinforced or filled polymers where the reinforcement is glass or other inorganic fibers or particulates such as silica, alumina and the like. Use of a blade fabricated from the polyaryl ketone Stilan (available from Raychem Corporation) of about 0.1 inches thick enables one to cut conventional telephone wire of 18 to 22 awg copper or aluminum.

Blades 11 and 12 may be employed in a cutter where each moves relative to the wire substrate. However, it is within the scope of the invention for one blade to be, in effect, an anvil and be fixed relative to the wire. Accordingly, the term "blade" includes an anvil structure.

Figure 2:
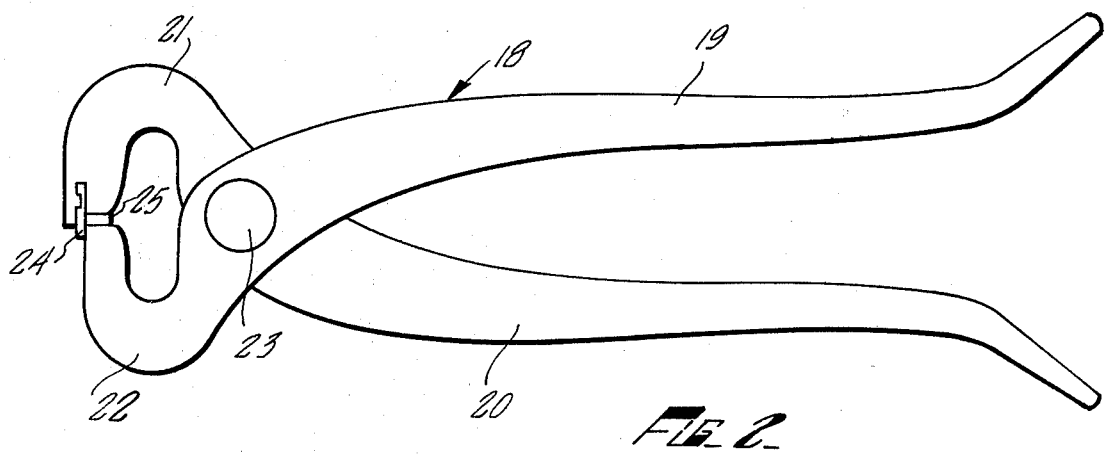
FIGS. 2 and 3 are illustrations of wire cutting devices of the present invention.

The presently preferred embodiments of this invention are in the form of hand held cutters in which the cutter 18 of FIG. 2 is illustrative. Cutter 18 is provided with handles 19 and 20 to move jaws 21 and 22, respectively, relative to each other about pivot member 23. Jaw 21 is provided with a removable blade 24 having a blade angle of 0° fabricated from a material as previously described. Jaw 22 is provided with blade 25, also removably mounted, having a blade angle of 0°. As shown, the blades are offset relative to each other in order that they may pass each other but be in close proximity when moved into contact with and through the wire being cut.

Figure 3:
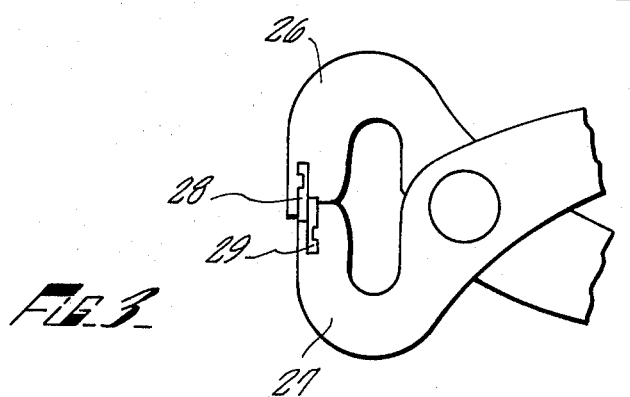

A similar cutter is shown in FIG. 3 in which jaws 26 and 27 have blades 28 and 29 respectively. Again the blades are removably mounted and a new blade can be used to displace the old when the latter is worn.

The effective cutting surface is determined by the cut width of the jaws and blades and, in the case of hand held cutters, can be as wide as will be accommodated by the strength of the human hand or as narrow as the access requirements for specific purposes require.

Figure 4:
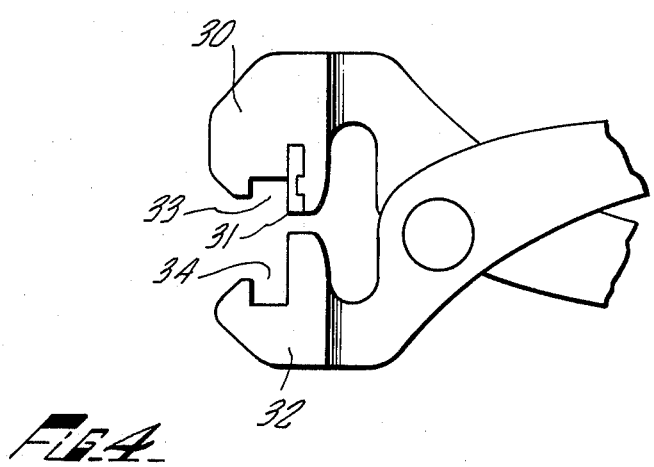
FIG. 4 illustrates a device adapted for use with splice connectors for telephone cable.
Figure 5:
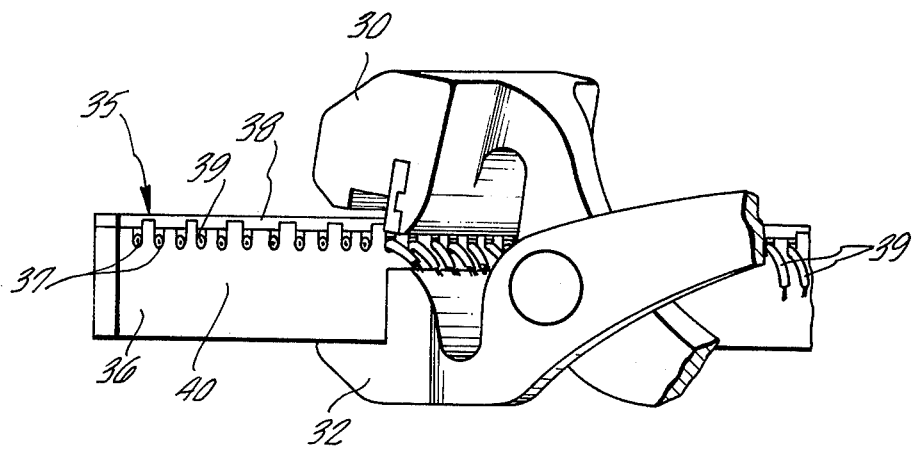
FIGS. 5 and 6 are partial views in perspective of the device of FIG. 4 as employed with a splice connector for telephone cable.
Figure 6:
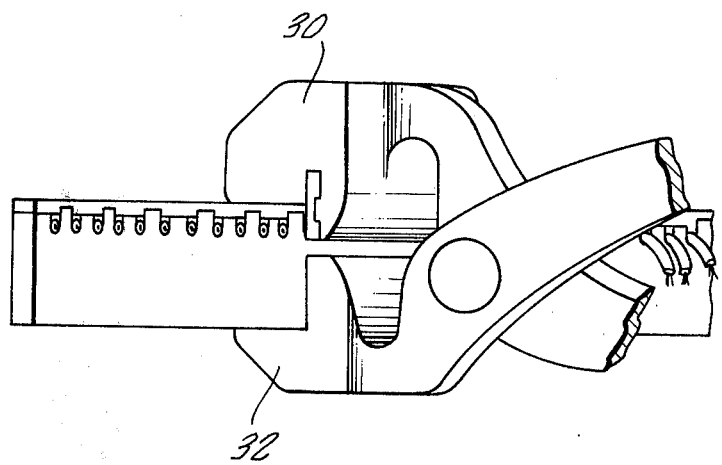

In FIGS. 4–6 is shown a cutter specially adapted for use with SECS and MS² splice connectors used in splicing telephone cable. The upper jaw 30 is provided with a blade 31 similar to the blades illustrated in FIGS. 2 and 3. Both upper jaw 30 and lower jaw 32 are provided with slots 33 and 34 to receive a splice connection 35 as shown in FIGS. 5 and 6. Only the details of connector 35 essential to the illustration of the present invention are shown. Shown in FIG. 5 are recesses 37, adapted to receive the individual conductors of a telephone cable. Upper member 38 is pressed over the individual wires 39 and interlocks with lower member 40 to securely retain the wires of the cable in the splice connector. Lower member 40 is provided with plural means to pierce the insulation of the insulated wires with a conducting element when the splice connector is assembled. These means are in electrical commmunication with the individual wires (not shown) to be incorporated in the new circuit.

When jaws 30 and 32 are closed, a plurality of the wires of the old cable can simultaneously be severed at the visible face of the splice connector (the extensions of these wires through the non-visible face of the splice connector are not shown) as shown in FIG. 6. In the assembly shown in FIGS. 5 and 6, the surfaces of recesses 37 upon which the wires 39 rest functions as one of the blades.

The use of the device of FIGS. 4–6 allow the wires to be cleanly cut at the face of the connector quickly and without shorting. The methods of the prior art, such as using metal diagonal cutting pliers, required that each member be cut individually. The cutters leave protrusions of wire which, if the cutting is not done with great care, result in lengths of exposed wire which can still contact each other, if displaced while in service, to cause short-circuits.

The foregoing is a description of the presently preferred embodiments of the present invention. It will be apparent that modifications of these can be made without departure from the spirit and scope of the invention. Accordingly, the present invention should be limited only by the appended claims.

We claim:

1. A non-shorting wire cutter comprising a pair of coacting blades having a blade angle of about 0°, said blades being offset from each other and at least one of said blades being movable relative to the other so that they pass each other as they move through a substrate from opposite sides, said blades being fabricated from a material having a bulk resistivity greater than about 1 ohm-cm and having sufficient hardness relative to their thickness to prevent substantial deformation when the blades are forced through the substrate.

2. A wire cutter according to claim 1 wherein the blades have a Rockwell hardness of about M30 or greater.

3. A wire cutter according to claim 1 wherein the blades are fabricated from an organic polymer.

4. A wire cutter according to claim 3 wherein the organic polymer is selected from the group consisting of acrylic polymers, epoxy resins, acrylonitrile, acrylonitrile-butadiene-styrene copolymer, polycarbonates, polyaryl ketones, polyaryl sulfones, polystryene, polyamides, acetals, phenolformaldehyde resins, and polymers of haloolefins.

5. A wire cutter according to claim 4 wherein the polymer further comprises an inorganic filler.

6. A wire cutter according to claim 1 adapted for use with a splice connector for a wire substrate wherein one of the blades is a surface integral with the connector.

7. A wire cutter according to claim 1 wherein only one of the blades is movable relative to the other.

8. A wire cutter according to claim 1 wherein both of the blades are movable relative to the other.

9. A process for simultaneously cutting plural insulated conductors without creating a short circuit comprising disposing said conductors between a pair of blade members having a blade angle of about 0° and forcing the blades therethrough, said blades being offset from each other and at least one of which being movable relative to the other, said blades being fabricated from a material having a bulk resistivity of at least about 1 ohm-cm and having sufficient hardness relative to their thickness to prevent substantial deformation when the blades are forced through the conductors.

10. A process according to claim 9 wherein the blades are fabricated from an organic polymer.

11. A method according to claim 10 wherein the organic polymer is selected from the group consisting of acrylic polymers, epoxy resins, acrylonitrile, acrylonitrile-butadiene-styrene copolymer, polycarbonates, polyaryl ketones, polyaryl sulfones, polystryene, polyamides, acetals, phenolformaldehyde resins, and polymers of haloolefins.

12. A method according to claim 11 wherein the polymer further comprises an inorganic filler.

13. A non-shorting wire cutting assembly comprising a blade having a blade angle of about 0°, connector means adapted to support a plurality of insulated conductors, means for moving at least one of said blade and said connector relative to the other through a path in which said blade and said connector are offset from each other, said blade and said connector being fabricated from a material having a bulk resistivity greater than about 1 ohm-cm and having sufficient hardness relative to their thickness to prevent substantial deformation when used to cut insulated wire.

14. The wire cutting assembly of claim 13 wherein said blade and said connector are fabricated from an organic polymer.

15. The wire cutting assembly of claim 14 wherein said surface of said connector adapted for supporting insulated connectors has a blade angle of about 0°.

* * * * *